United States Patent
Bansal et al.

(10) Patent No.: US 12,452,209 B2
(45) Date of Patent: Oct. 21, 2025

(54) VERIFYING DATA SOURCES USING ATTESTATION BASED METHODS

(71) Applicant: Cisco Technology, Inc., San Jose, CA (US)

(72) Inventors: Priyanka Bansal, Bangalore (IN); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 781 days.

(21) Appl. No.: 17/511,415

(22) Filed: Oct. 26, 2021

(65) Prior Publication Data

US 2023/0126851 A1    Apr. 27, 2023

(51) Int. Cl.
*H04L 29/06* (2006.01)
*H04L 9/40* (2022.01)

(52) U.S. Cl.
CPC ........ *H04L 63/0236* (2013.01); *H04L 63/126* (2013.01); *H04L 63/0272* (2013.01); *H04L 63/0428* (2013.01)

(58) Field of Classification Search
CPC .............. H04L 63/0236; H04L 63/126; H04L 63/0272; H04L 63/0428
See application file for complete search history.

(56) References Cited

U.S. PATENT DOCUMENTS

| | | | | |
|---|---|---|---|---|
| 2003/0217292 A1* | 11/2003 | Steiger | ..................... | H04L 63/20 713/168 |
| 2005/0114648 A1* | 5/2005 | Akundi | ............... | H04L 63/0236 713/153 |
| 2012/0131354 A1* | 5/2012 | French | .................. | H04L 9/3213 713/189 |
| 2015/0318995 A1* | 11/2015 | Leggette | ............. | H04L 63/0435 713/181 |
| 2016/0241574 A1 | 8/2016 | Kumar et al. | | |
| 2018/0034643 A1* | 2/2018 | Yang | ..................... | H04L 63/166 |
| 2018/0124076 A1* | 5/2018 | Zibuschka | .......... | H04L 63/1491 |
| 2018/0212772 A1* | 7/2018 | Leavy | ..................... | H04L 9/085 |
| 2018/0367428 A1 | 12/2018 | Di Pietro et al. | | |
| 2019/0238333 A1* | 8/2019 | Grubin | .................. | H04L 9/0833 |
| 2019/0268303 A1 | 8/2019 | Schiappa et al. | | |
| 2020/0120025 A1* | 4/2020 | Voit | ........................ | H04L 45/74 |
| 2020/0175179 A1* | 6/2020 | Iyer | ........................ | G06F 21/602 |

(Continued)

FOREIGN PATENT DOCUMENTS

WO    WO2020143906    7/2020

*Primary Examiner* — Vance M Little
(74) *Attorney, Agent, or Firm* — Lee & Hayes, P.C.

(57) ABSTRACT

In one embodiment, methods for monitoring network traffic are described. The method may include receiving network traffic that is flowing through the network. The method further includes generating one or more packets that include metadata representing a monitored characteristic of the network traffic. Additionally, the method may include generating, at least partly by a secure hardware chip of the network device and using a private key, a signature indicating the metadata was generated at the network device and a time at which the metadata was generated at the network device. The method may further include populating the one or more packets with the signature. Additionally, the method may include sending the one or more packets to a collection system associated with a network monitoring system.

20 Claims, 6 Drawing Sheets

(56) References Cited

U.S. PATENT DOCUMENTS

| | | |
|---|---|---|
| 2020/0322075 A1 | 10/2020 | Bhandari et al. |
| 2020/0322353 A1* | 10/2020 | Bhandari ............ H04L 63/1425 |
| 2020/0322386 A1 | 10/2020 | Mani et al. |
| 2021/0073003 A1* | 3/2021 | Jacquin ................... G06F 21/44 |

* cited by examiner

VERIFYING DATA SOURCES USING ATTESTATION BASED METHODS

TECHNICAL FIELD

The present disclosure relates generally to the field of computer networking, and more particularly to securing communications for monitoring of network data through a network.

BACKGROUND

Network data security is crucial in the field of computer networking. In particular, behavioral and threat analysis performed within a service network is driven by analyzing data collected by various network devices. For instance, network monitoring systems collect information from various network devices (e.g., routers, switches, etc.) within a network. The information may relate to data flow information occurring at the network devices. The network devices generate packets that include the information and transmit the packets to a collector of the network monitoring system. The collector then verifies the information and can transmit the information to an analysis console within the system for use in performing behavioral and threat analysis functions. Accordingly, the use of the information from the network device is vital in ensuring network safety.

In order to protect the data transmitted from a network device to a collector, it is common to encrypt the data being transmitted in order to obfuscate the data to prevent potentially malicious entities from obtaining the data. For instance, VPNs use a process called "tunneling" to extend a private network across a public network, such as the Internet. The process of tunneling involves encrypting the data prior to transmission at the sending device to obfuscate the encrypted data as it is transmitted across the networks, and then decrypting the data at the receiving device at the VPN to act on the data.

Encrypted tunnels, such as VPN tunnels, have become commonplace and have many uses and advantages. However, the process of encrypting data for transmission through the tunnels is time consuming and computationally intensive. Encrypted tunnels are useful in that they enable verification that data in a packet has not been compromised during transmission from the sending device to the receiving device. However, encrypted tunnels are not able to verify that the sending device is a trustworthy source and/or has not been compromised. For instance, the collector may receive data from a network device via an encryption tunnel. The collector may determine that the data has not been tampered with during transmission, however, the collector is unable to determine that the network device itself is secure and has not been tampered with.

Additionally, network devices (e.g., nodes) acting as data sources can be authenticated using encryption techniques (e.g., using a symmetric key and public key authentication schemes). However, identity authentication of a network device serving as a data source may not be sufficient. The network device itself may have become compromised so that the data source may no longer be a trusted entity. A compromised data source can perpetuate harm to the entire network. For instance, any applications relying on the data source to perform their tasks (e.g., creating a baseline for behavioral threat analysis) are also likely to be compromised. There therefore exist needs for systems and methods of verifying the trustworthiness of data sources within networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
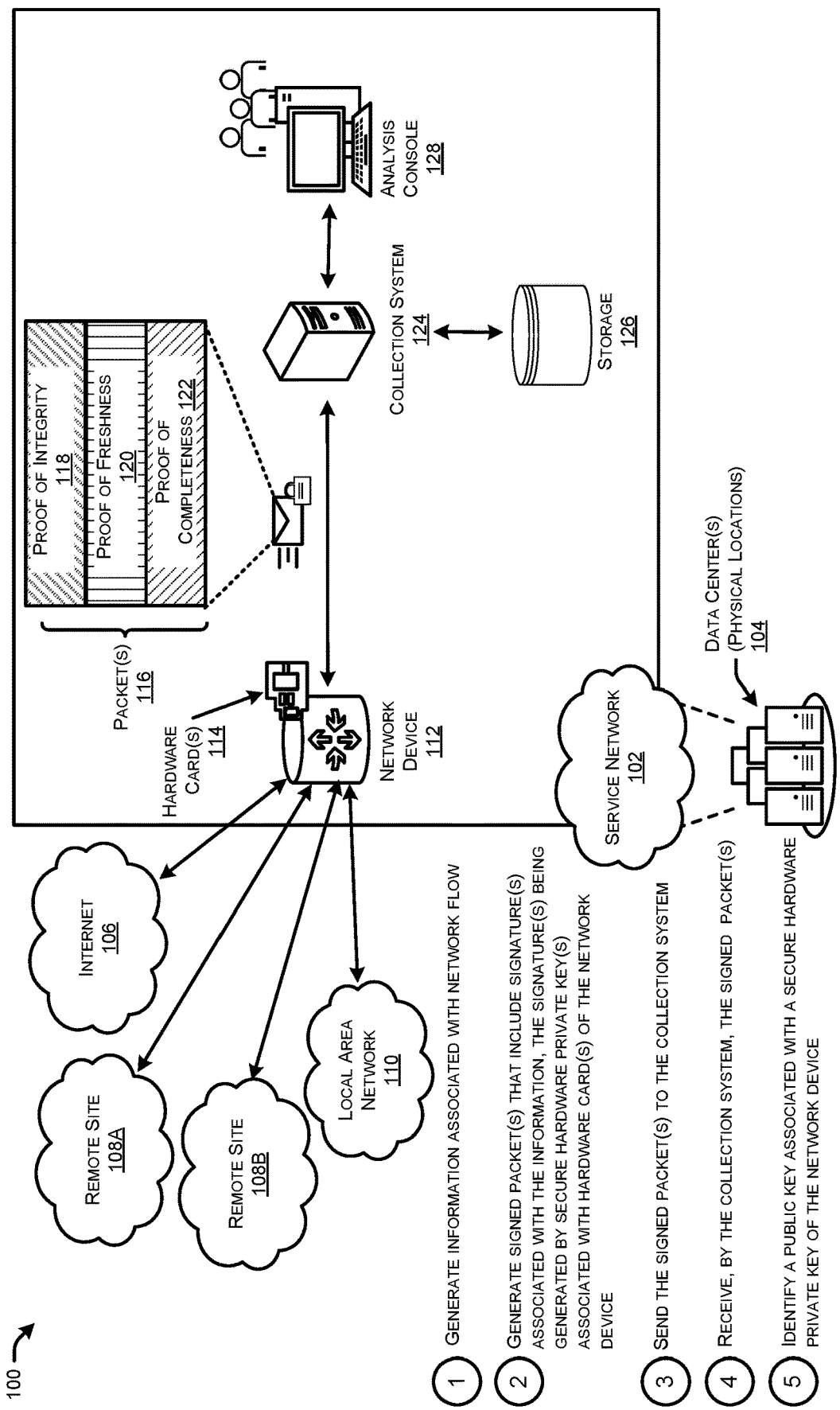
FIG. 1 illustrates a system-architecture diagram of an environment in which a network device generates and sends packets containing information about network flow to a collection system.

The present disclosure relates generally to techniques for using hardware-based secure signatures to provide proof of integrity for packets sent through a network for monitoring network data.

A method to perform techniques described herein may include receiving network traffic that is flowing through the network. Further, the techniques include generating one or more packets that include metadata representing a monitored characteristic of the network traffic. The techniques also include generating, at least partly by a secure hardware chip of the network device and using a private key, a signature indicating the metadata was generated at the network device and a time at which the metadata was generated at the network device. Additionally, the techniques include populating the one or more packets with the signature indicating the metadata was generated at the network device and the time at which the metadata was generated at the network device. The techniques further include sending the one or more packets to a collection system associated with a network monitoring system.

A system to perform techniques described herein may include receiving, from a network device, one or more packets that include metadata representing a monitored characteristic of the network traffic. Further the techniques include determining that the one or more packets include a signature, associated with the metadata, that has been encrypted using a private key. Additionally, the techniques include identifying, based at least in part on accessing storage associated with the system, a public key that corresponds to the private key. The techniques further include verifying the signature using the public key.

Additionally, the techniques described herein may be performed by a system and/or device having non-transitory computer-readable media storing computer-executable instructions that, when executed by one or more processors, performs the method described above.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

As noted above, network data security is crucial in the field of computer networking. In particular, behavioral and threat analysis performed within a service network is driven by analyzing data collected by various network devices (e.g., routers, switches, etc.). For instance, a data center may include a service network with various network devices (e.g., routers, switches, servers etc.). Routers can communicate with other data centers (e.g., other network(s)) and can route traffic through the service network to a particular application within the service network. For instance, a router may receive a packet that is destined for an application within the service network. The router determines a destination IP address associated with a server within the service network and transmits the packet to a switch. The switch may then open a connection with the corresponding server and transmit the packet to an application on the corresponding server. Accordingly, for both incoming and outgoing traffic, network devices may collect data (e.g., metadata, telemetry data, network data, etc.) regarding network flow. In order to collect metadata around the flow of traffic within a service network, the network devices may implement a flow protocol (e.g., Cisco NetFlow, Juniper J-Flow, Datadog, Huawei NetStream, etc.). For instance, the network devices may implement NetFlow protocol, which enables the network device to collect active IP network traffic as it flows in or out of an interface within the service network. The network devices may then generate packets that include information (e.g., metadata, telemetry data, network data, etc.) about the network flow and transmit the packets to a collection system (e.g., a collector) within the service network. The collector then verifies the information and can transmit the information to an analysis console within the system for use in performing behavioral and threat analysis functions. Accordingly, the use of the information from the network device is vital in ensuring network safety.

In order to protect the data transmitted from a network device to a collector, it is common to encrypt the data being transmitted in order to obfuscate the data to prevent potentially malicious entities from obtaining the data. For instance, VPNs use a process called "tunneling" to extend a private network across a public network, such as the Internet. The process of tunneling involves encrypting the data prior to transmission at the sending device to obfuscate the encrypted data as it is transmitted across the networks, and then decrypting the data at the receiving device at the VPN to act on the data.

Encrypted tunnels, such as VPN tunnels, have become commonplace and have many uses and advantages. However, the process of encrypting data for transmission through the tunnels is time consuming and computationally intensive. Additionally, encrypted tunnels enable verification that data in a packet has not been compromised during transmission from the sending device to the receiving device. However, encrypted tunnels are not able to verify that the sending device is a trustworthy source and/or has not been compromised. For instance, the collector may receive data from a network device via an encryption tunnel. The collector may determine that the data has not been tampered with during transmission, however, the collector is unable to determine that the network device itself is secure and has not been tampered with.

Additionally, network devices (e.g., nodes) acting as data sources can be authenticated using encryption techniques (e.g., using a symmetric key and public key authentication schemes). However, identity authentication of a network device serving as a data source may not be sufficient. The network device itself may have become compromised so that the data source may no longer be a trusted entity. A compromised data source can perpetuate harm to the entire network. For instance, when a data source (e.g., a network device) is compromised, any applications relying on the data source to perform their tasks (e.g., such as creating a baseline for behavioral threat analysis) are also likely to be compromised.

This disclosure describes techniques and mechanisms for signing and verifying packets sent through a network using hardware-based signatures. For instance, the techniques may comprise monitoring network traffic, generating one or more packets that include metadata representing a monitored characteristic of the network traffic, generating, at least partly by a secure hardware chip of the network device and using a private key, a signature indicating the metadata was generated at the network device, and populating the one or more packets with the signature indicating the metadata was generated at the network device. Additionally, this disclosure describes techniques for receiving packets and decrypting signatures within the packets using different encryption protocols to verify the data source. In this way, a service network can not only verify that the data has not been tampered with during transmission from the network device, but also that the network device itself is in a secure and trustworthy data source.

In some examples, the signature may comprise a proof of integrity. The proof of integrity may comprise a Canary stamp, a hardware fingerprint, or the like. The proof of integrity may indicate that metadata and/or information included in the packet was generated at the network device. The proof of integrity may be generated based at least in part on the hardware card(s). For instance, as noted above, the proof of integrity may comprise a Canary stamp and/or a hardware fingerprint that is stored securely in the hardware card. In some examples, the proof of integrity may be encrypted (e.g., signed) using a private key (e.g., a Secure Unique Device Identification (SUDI)) associated with the network device.

In some examples, the techniques may further include signing the packets sent through the network with a proof of freshness. In some examples, the proof of freshness may comprise one or more metadata elements corresponding to one or more current counters (e.g., clock, reset, reboot) from the network device's Trusted Platform Module (TPM) and/or a record count (e.g., an indication of the number of records contained within the packet). A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode. In some cases, metadata elements can be created by extracting current counters (e.g., clock, reset, reboot) from a network device's TPM, and incorporating the counters into a packet. The metadata elements can thereby provide a non-spoofable metadata element, which can bind continuously incrementing counters with a known external state. Any resetting of the TPM counters is visible in any subsequent TPM queries, and any rebooting of a network device is also exposed in subsequent TPM queries. Within these bounds of reset and reboot, the TPM's time ticks counter continuously increments. Therefore, any TPM information which includes these counters can be determined to have occurred subsequent to any previously-received measurement from the network device. Also, if the reset and reboot counters have not changed, the incremental time since any previous measurement can also be known. In some examples, each counter and/or the record count can individually, or in combination be encrypted (e.g., signed) using the private key associated with the network device.

In some examples, the techniques may further include signing packets sent through the network with a proof of completeness. In some examples, the proof of completeness may comprise a sequence count associated with a record in the packet. The proof of completeness can help prevent duplication of records and replay attacks by ensuring the record number within the packet is accurate. In some examples, the proof of completeness may be signed (e.g., encrypted) using the private key associated with the network device.

In some examples, metadata elements containing security measurements or evidence can be used to provide verifiable evidence of device trustworthiness (e.g., integrity, freshness, completeness, etc.). The metadata elements can include applicable data for verifying trustworthiness of a network device and be provided through an applicable technique for verifying device trustworthiness. For example, the metadata elements can be provided as part of the proof of integrity (e.g., via a canary stamp associated with the device, where the Canary stamp can indicate or otherwise include a signed measurement associated with the network device for verifying trustworthiness of the device). In some examples, the attestation information can include the proof of integrity via a Canary stamp, a hardware fingerprint, a SUDI of the source device, or an attestation key.

In this way, collectors within a service network can not only verify that the data has not been tampered with during transmission from the network device, but also that the network device itself is in a secure and trustworthy data source. By ensuring that the data source is secure, the techniques described herein improve network security and reduce harm to the network and applications that rely on the information transmitted from the data source.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which a network device 112 generates and sends packets 116 containing information about network flow to a collection system 124.

In some examples, the environment 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

In some instances, the network device 112 is included as part of a service network 102. The service network 102 may generally include, manage, or otherwise be associated with one or more applications or services utilized by users accessing internet 106, remote site(s) 108A, 108B, and/or Local Area Network (LAN) 110. The service network 102 may provide any type of application or service for use by users of client devices (not shown). However, in other instances the network device 112 may be associated with any type of computing device and be used for any purpose. In some instances, the network device 112 is included as part of Internet 106, remote site(s) 108A, 108B (collectively referred to as remote site(s) 108 herein), and/or LAN 110, and communicates with collection system 124 over service network 102. In some examples, network device 112 comprises a router, a switch, or any other type of device included in a network architecture.

The network device 112 may receive data regarding network flow from one or more networks, such as internet 106, LAN 110. The network device 112 may receive data over the internet 106 and/or LAN 110 via any type of protocol, such as transmission control protocol/Internet protocol (TCP/IP) that is used to govern connects to and over the Internet. In some examples, the network device 112 receives data from one or more remote site(s) 108. Remote site(s) 108 may correspond to neighboring network(s), connections to client devices, or the like. For instance, network device 112 may establish a communication connection to a client device (not shown) over one or more remote site(s) 108. The remote site(s) 108 may include any viable communication technology, such as wired and/or wireless modalities and/or technologies. Networks 126 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The client device (not shown) and network device 112 may communicate using any type of protocol over the remote site(s) 108, such as the transmission control protocol/Internet protocol (TCP/IP) that is used to govern connects to and over the Internet.

The network device 112 may comprise one or more hardware cards 114. In some examples, the one or more hardware cards 114 correspond to hardware chips 114 on the network device 112, that include stamp(s) and/or hardware fingerprint(s) that are stored securely in the hardware card 114, such that data received from the chip is "tamperproof" (e.g., provides a verifiable proof that the data could only have come from the originator of the measurement). In some examples, the hardware cards may comprise one or more of an Aikido/ACT2/TAM, an Intel SGX, or some other forwarding chip which is also considered "tamper proof". In some examples, each individual hardware card 114 stores a unique hardware fingerprint that identifies the individual hardware card 114. In some examples, the hardware cards 114 comprise a forwarding line card and/or a forwarding line chip.

At "1", the network device 112 may generate information associated with network flow within the service network 102. As noted above, the network device 112 may implement one or more flow protocols (e.g., Cisco NetFlow, Juniper J-Flow, Datadog, Huawei NetStream, etc.), in order to collect data (e.g., metadata, telemetry data, network data, etc.) regarding network flow. For instance, network device 112 may implement a NetFlow protocol, such that the network device 112 can collect data regarding network flow for incoming packets received from Internet 106, LAN 110, and/or remote site(s) 108 and/or outgoing packets sent to Internet 106, LAN 110, and/or remote site(s) 108. The network device 112 may analyze the data and generate, based on the data, the information associated with the network flow. In some examples, the information may include metadata associated with the network flow. In some examples, the metadata may include a monitored characteristic (e.g., volume of traffic, traffic type, destinations, etc.) of the network flow. In some examples, the hardware cards 114 comprise a forwarding line chip and/or a forwarding line card. In this example, the forwarding line card and/or forwarding line chip of the network device 112 may send network traffic to a neighbor network device, such as network device(s) at remote site(s) 108.

At "2", the network device 112 may generate signed packet(s) 116, the packet(s) 116 including signature(s) associated with the information, the signature(s) being generated by one or more secure hardware private key(s) associated with hardware card(s) 114 of the network device 112. In some examples, the network device 112 may generate a signature that includes a proof of integrity 118. The proof of integrity 118 may indicate that the metadata and/or information included in the packet 116 was generated at the network device 112. The proof of integrity 118 may be generated based at least in part on the hardware card(s) 114. For instance, as noted above, the proof of integrity 118 may comprise a Canary stamp and/or a hardware fingerprint that is stored securely in the hardware card 114. In some examples, the signature may further comprise a proof of freshness 120. As described above, the proof of freshness 120 may comprise one or more metadata elements corresponding to one or more current counters (e.g., clock, reset, reboot) from the network device's TPM and/or a record count (e.g., an indication of the number of records contained within the packet 116). In some examples, each counter and/or the record count can individually, or in combination be encrypted (e.g., signed) using the private key (e.g., SUDI) associated with the network device 112. In some examples, the signature may further comprise a proof of completeness 122. As described above, the proof of completeness 122 may comprise a sequence number associated with a record in the packet 116. In some examples, one or more of the proof of integrity 118, the proof of freshness 120, the proof of completeness 122, and/or any of the other information included in the packet 116 may be encrypted using the private key (e.g., SUDI) associated with the network device 112.

At "3" the network device 112 may send the signed packet(s) 116 to the collection system 124. As noted above, the collection system 124 may comprise one or more servers. In some examples, the network device 112 sends the signed packet(s) 116 via the service network 102.

At "4", the collection system 124 may receive the signed packet(s) 116. In some examples, the collection system 124 may analyze the packet(s) 116. In some examples, the collection system 124 may determine that the packet(s) 116 include signature(s) corresponding to secure hardware private key(s) associated with the hardware card(s) 114 of the network device 112. In some examples, the computing system 124 may determine that one or more of the packet(s) include one or more signature(s) that have been encrypted using a private key. As noted above, the private key may comprise a SUDI associated with the network device 112.

At "5", the collection system 124 may identify a public key associated with a secure hardware private key of hardware card 114 of the network device 112. In some examples, the collection system 124 identifies the public key based at least partly on accessing storage 126 associated with the service network 102. In some examples, the storage 126 may comprise a plurality of public keys corresponding to secure hardware private keys associated with the hardware card(s) 114 and/or public keys corresponding to private key(s) (e.g., SUDI) of the network device(s) 112, etc. In some examples, storage 126 may be external to the collection system 124. In other examples, the storage 126 may be included as part of the collection system 124.

At "6" the collection system 124 may verify, based on decrypting the signature(s) 116 using the public key, the information included in the packet(s) 116. In some examples, the collection system 124 may verify the signature(s) after decrypting them. In some examples, based at least partly on verifying the signature(s), the collection system 124 may send the packet(s) 116 to the analysis console 128. The analysis console 128 may comprise an analysis application. In some examples, the analysis console 128 may determine whether to accept the information included in the packet(s) 116. In some examples, the analysis console 128 may translate the information received in the packet(s) 116 into charts, graphs, tables, and other visualizations related to network performance. In some examples, the analysis console 128 may perform behavioral and threat analysis operations (e.g., identifying compromised network devices, identifying network bottlenecks, etc.) using the information contained in packet(s) 116. Thus, the techniques described herein can better identify threats within a network, such as by identifying compromised data sources.

Figure 2:
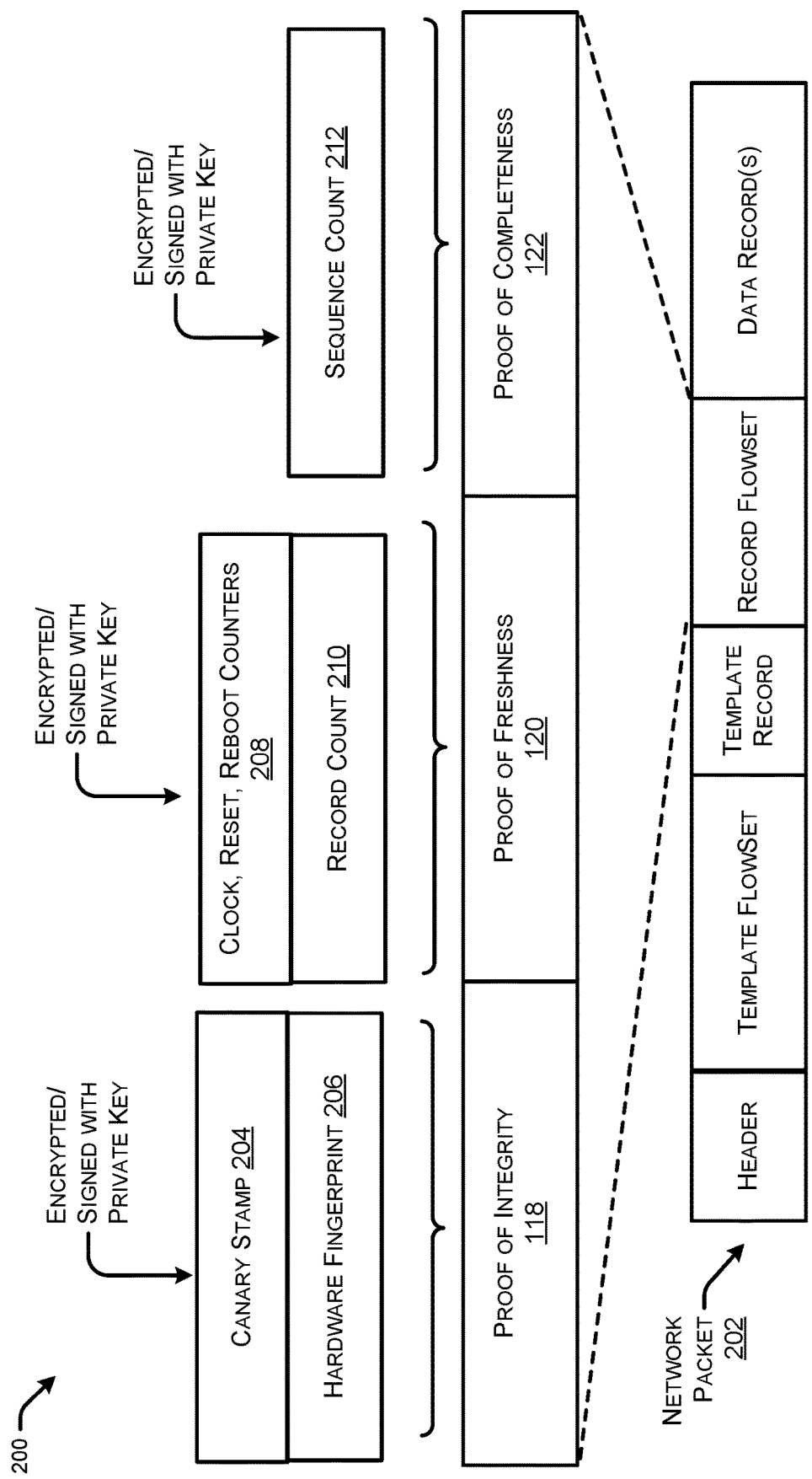
FIG. 2 illustrates an example environment including a network packet that is generated by a network device.

FIG. 2 illustrates an example environment 200 including a network packet 202 that is generated by a network device 112. In some examples, the network packet 202 is generated by the network device 112, where the network device 112 has a flow protocol enabled. In the illustrative example, the network packet 202 may correspond to an example packet built by a network device 112 with Cisco NetFlow Version 9 services enabled.

As illustrated, the network packet 202 may include a header, template flowset(s), template record(s), record flowset(s), and data record(s). The packet header may provide basic information about the network packet 202, such as the NetFlow version, number of records contained within the packet, and sequence numbering, enabling lost packets to be detected. As illustrated, the packet header may be followed by information that must be parsed and interpreted by the collection system 124. In some examples, the network packet may include template flowset(s). A template flowset comprises a collection of one or more template records that have been grouped together in the network packet 202. A template record is used to define the format of subsequent data records that may be received in current or future export packets. In some examples, a template record may not indicate the format of data records within that same network packet 202. Accordingly, the collection system (e.g., collector and/or collector application) may cache any template records received, and then parse any data records it encounters by locating the corresponding template record within the cache. A record flowset comprises a collection of one or more data records that have been grouped together in an export packet. A data record provides information about an IP flow that exists on the network device that generated the network packet 202. Each group of data records (that is, each record flowset) may reference a previously transmitted template ID, which can be used by the collection system 124 to parse the data contained within the records.

In the illustrative example, the network packet 202 may include record flowsets that comprise one or more of a proof of integrity 118, a proof of freshness 120, and/or a proof of completeness 122. In some examples, one or more of the template flowset(s), template record(s), record flowset(s), and/or data record(s) may comprise one or more proof of integrity 118, proof of freshness 120, and/or proof of completeness 122. In some examples, the network packet may comprise only a proof of integrity 118. In some examples, the network packet 202 may comprise a proof of integrity 118 and one or more of the proof of freshness 120 and/or the proof of completeness 122.

As described above, the proof of integrity 118 may comprise a Canary stamp 204 and/or a hardware fingerprint 206. In some examples, the hardware fingerprint 206 is a secure, unique identifier associated with a hardware card 114 of the network device 112. In some examples, the hardware card 114 may be included as part of the network device's 112 TPM. As noted above, in some examples, the proof of integrity 118 may be signed and/or encrypted using a private key (e.g., SUDI) of the network device 112. In some examples, the encryption may be performed using an encryption protocol (e.g., SSL, TSL, DTSL, etc.). Accordingly, by utilizing stamps 204 and/or hardware fingerprints 206, the proof of integrity 118 may provide a verifiable proof of possession, indicating the various types of data included in the network packet 202 were generated at the network device 112. In some examples, the proof of integrity 118 may be generated in Confidential Compute hardware Enclave (e.g., such as Intel SGX, Arm TrustZone, etc.) of the network device 112. In this example, the proof of integrity 118 may further comprise a signature associated with the Confidential Compute hardware Enclave. In some examples, the proof of integrity 118 may be generated by one or more hardware cards 114 of the network device 112. For instance, a network device 112 may comprise multiple hardware cards 114. In some examples, the hardware cards 114 correspond to forwarding line cards and/or forwarding line chips that measure network flow at the network device 112. In this example, each hardware card 114 that is measuring network flow may sign and/or stamp metadata associated with the network flow measurements. In this way, if there is a threat detected within the network and/or system, the packet generation subsystem within the network device 112 can still be verified as a trustworthy data source.

As described above, the proof of freshness 120 may comprise one or more counters (e.g., clock, reset, and/or reboot) 208 and a record count 210. In some examples, the proof of freshness 120 may comprise one or more metadata elements corresponding to one or more counters (e.g., clock, reset, reboot) 208 extracted from the network device's 112 TPM and/or a record count 210 (e.g., an indication of the number of records contained within the packet 116). In some examples, the clock counter corresponds to a time in milliseconds since the network device 112 was first booted. In some examples, the reset counter corresponds to a number of times that the network device 112 has been reset. In some examples, the reboot counter corresponds to a number of time the network device 112 has been booted and/or rebooted. In some examples, the proof of freshness 120 may be signed and/or encrypted using a private key (e.g., SUDI) of the network device 112. In some examples, each individual counter 208 may be signed and/or encrypted using the private key. In some examples, the record count 210 may be signed and/or encrypted using the private key. In some examples, the encryption may be performed using an encryption protocol (e.g., SSL, TSL, DTSL, etc.). Accordingly, by utilizing counters from a network device's TPM hardware card 114, the proof of freshness 120 may act as a unique, tamperproof identifier of the particular hardware card 114 of the network device 112.

As described above, the proof of completeness 122 may comprise a sequence count 212. In some examples, the sequence count 212 is associated with a record in the packet 116, such as a data record and/or a record flowset. The proof of completeness can help prevent duplication of records and replay attacks by ensuring the record number within the packet is accurate. In some examples, the proof of completeness 122 may be signed (e.g., encrypted) using the private key (e.g., SUDI) associated with the network device 112. In some examples, the encryption may be performed using an encryption protocol (e.g., SSL, TSL, DTSL, etc.).

Figure 3:
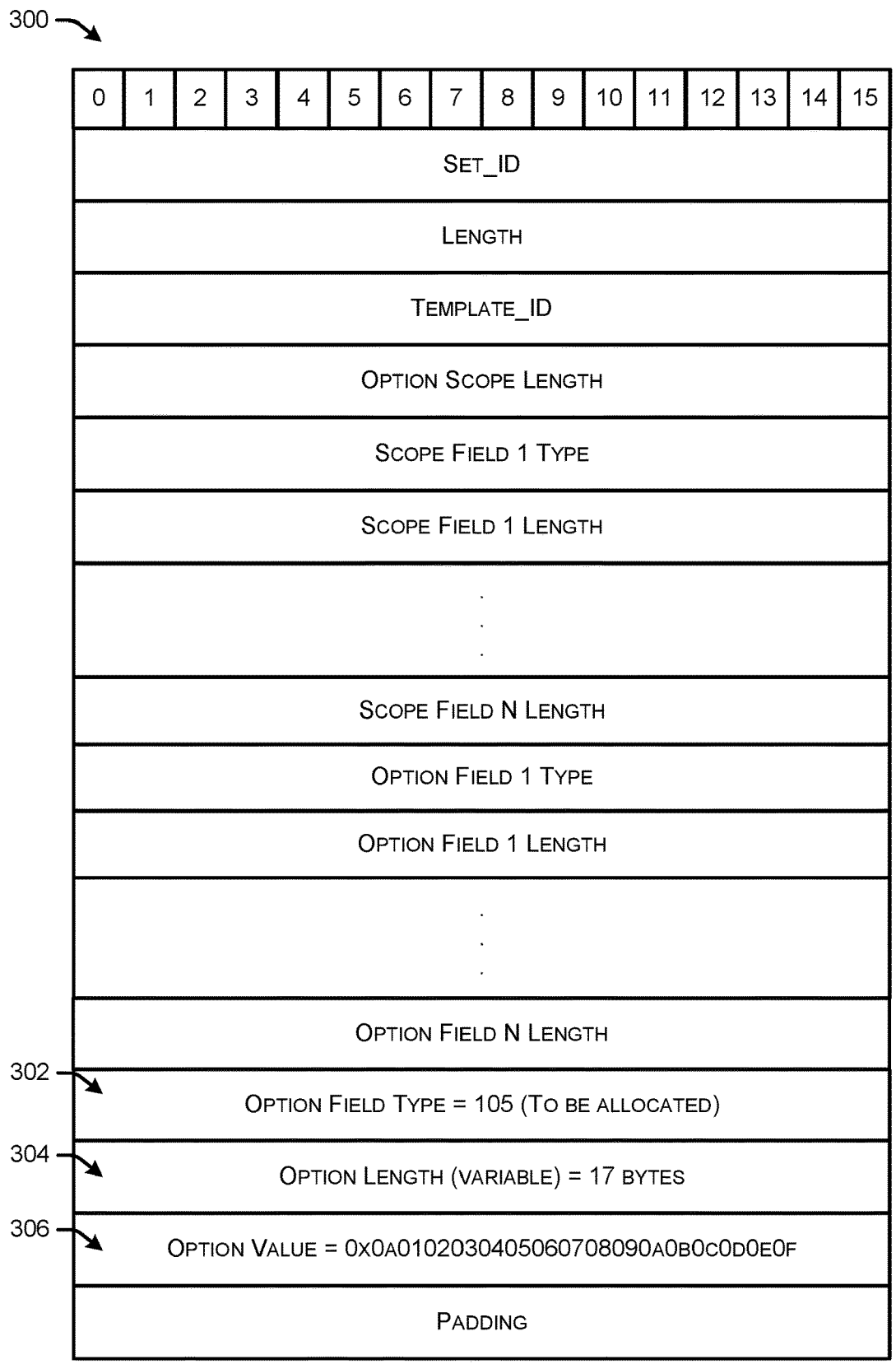
FIG. 3 illustrates an example environment including a template that may be included in a network packet generated by a network device.

FIG. 3 illustrates and example environment including a template 300 that may be included in a network packet 202 generated by a network device 112. In some examples, the template 300 may correspond to a NetFlow Version 9 Options Template. For instance, an options template (and its corresponding options data record). Rather than supplying information about IP flows, option templates may be used to supply metadata about the NetFlow process itself to the collection system 124.

As illustrated, the template 300 may include various fields, such as set ID, length, template ID, option scope length, scope field 1 type, scope field 1 length, scope field N length, option field 1 type, option field 1 length, option field N length, and padding. In some examples, each of these fields are standard in the Netflow Version 9 Options Template.

As illustrated, the template 300, may be extended to include attestation information in any number of additional fields. For instance, the template 300 may be extended to include option field type 302, option length 304, and option value 306. In some examples, option field type 302 may correspond to a numeric value that represents the type of the field that appears in an associated options record. In the illustrative example, the option field type (e.g., "105") may correspond to a field associated with attestation information. In some examples, the option length 304 is variable. In some examples, the option length may comprise a length of between 2 and 252 bytes. In the illustrative example, the option value 304 (e.g., "17 bytes") indicates the length of the information included in the option value 306. In some examples, the option value 306 may comprise attestation information and may be of a particular size (e.g., 17 bytes). In some examples, the first byte may indicate an attestation type and the remaining 16 bytes may comprise the attestation information. In the illustrative example, the first byte (e.g., "0x0a") may indicate that the attestation type is hardware fingerprinting 206 associated with a proof of integrity 118. Continuing on with the illustrative example, the remaining 16 bytes (e.g., "0102030405060708090a0b0c0d0e0f") may comprise the hardware fingerprint 206 associated with a hardware card 114 of the network device. In some examples, the first byte may indicate that the attestation type is a Canary stamp 204 associated with a proof of integrity 118. In this example, the remaining 16 bytes may comprise the Canary stamp associated with the network device 112. In some examples, the template 300 may include attestation information for both a Canary stamp 204 and a hardware fingerprint 206 for proof of integrity 118. In some examples, the option value 306 may comprise attestation information that is signed and/or encrypted using a private key (e.g., SUDI) associated with the network device 112. In some examples, the template 300 may further be extended to carry attestation information associated with one or more of a proof of freshness 120 and/or proof of completeness 122 described above.

Figure 4:
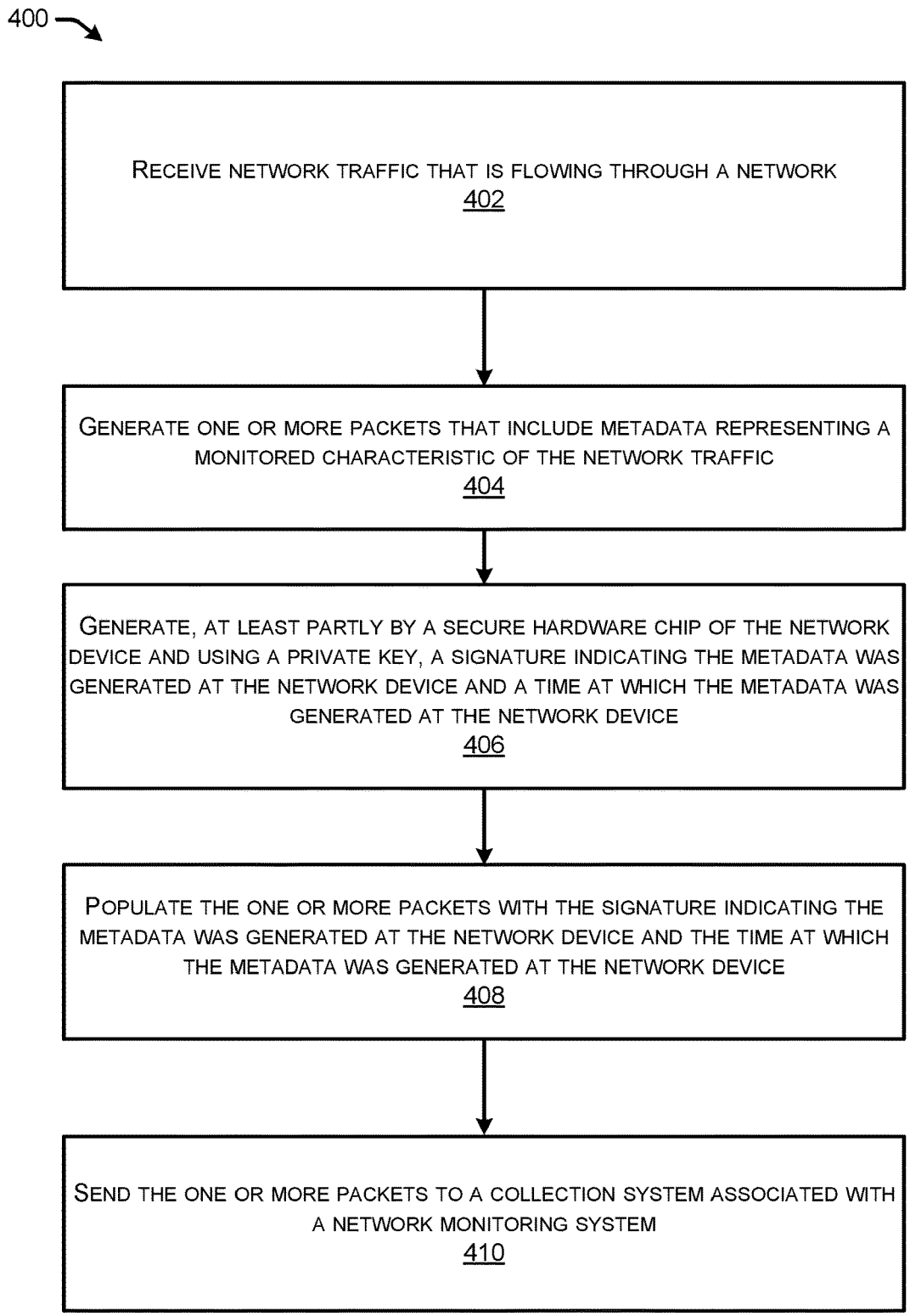
FIG. 4 illustrates a flow diagram of an example method for a device to generate packets that include secure hardware signature(s) indicating that the device is a trustworthy data source.

FIG. 4 illustrates a flow diagram of an example method 400 for a device to generate packets that include secure hardware signature(s) indicating that the device is a trustworthy data source. In some instances, the steps of method 400 may be performed by a device (e.g., network device 112) that includes one or more processors and one or more non-transitory computer-readable media storing computer-executable instructions that, when executed by the one or more processors, cause the one or more processors to perform operations of method 400.

At 402, the network device may receive network traffic that is flowing through the network. For instance, the network device may receive data from one or more of the Internet 106, Remote Site(s) 108, and/or LAN 110. As described above, the network device may implement a flow protocol (e.g., Cisco NetFlow, Juniper J-Flow, Datadog, Huawei NetStream, etc.), in order to collect data (e.g., metadata, telemetry data, network data, etc.) regarding network flow. For instance, network device 112 may implement a NetFlow protocol, such that the network device 112 can collect data regarding network flow for incoming packets received from Internet 106, LAN 110, and/or remote site(s) 108 and/or outgoing packets sent to Internet 106, LAN 110, and/or remote site(s) 108.

At 404, the network device may generate one or more packets that include metadata representing a monitored characteristic of the network traffic. For instance, the network device may generate one or more packets, such as network packet 202 described above. In some examples, the metadata may include a monitored characteristic (e.g., volume of traffic, traffic type, destinations, etc.) of the network flow. As described above, the one or more packets may comprise a header, template flowset(s), template record(s), record flowset(s), and data record(s).

At 406, the network device may generate, at least partly by a secure hardware chip of the network device and using a private key, a signature indicating the metadata was generated at the network device. For instance, the network device may generate a signature comprising one or more of a Canary stamp 204 and/or a hardware fingerprint 206. In some examples, the secure hardware chip may correspond to hardware card 114 described above. The private key may comprise a SUDI associated with the network device 112. In some examples, the secure hardware chip may comprise a forwarding line card and/or a forwarding line chip. In this example, the forwarding line card and/or forwarding line chip of the network device 112 may generate the first signature. In some examples, the forwarding line card and/or forwarding line chip may send network traffic to a neighbor network device, such as network devices at remote site(s) 108.

In some examples, the signature for the metadata further indicates at least a time at which the metadata was generated at the network device. In some examples, the signature further indicates a number of reboots or a number of resets of the network device. In some examples, the signature for the metadata further indicates a sequence number (e.g., a sequence count 212).

At 408, the network device may populate the one or more packets with the signature indicating the metadata was generated at the network device. For instance, the network device may populate the template 300 with attestation information including the signature.

At 410, the network device may send the one or more packets to a collection system associated with a network monitoring system. For instance, the network device may send the one or more packets to collection system 124 via the service network 102.

Figure 5:
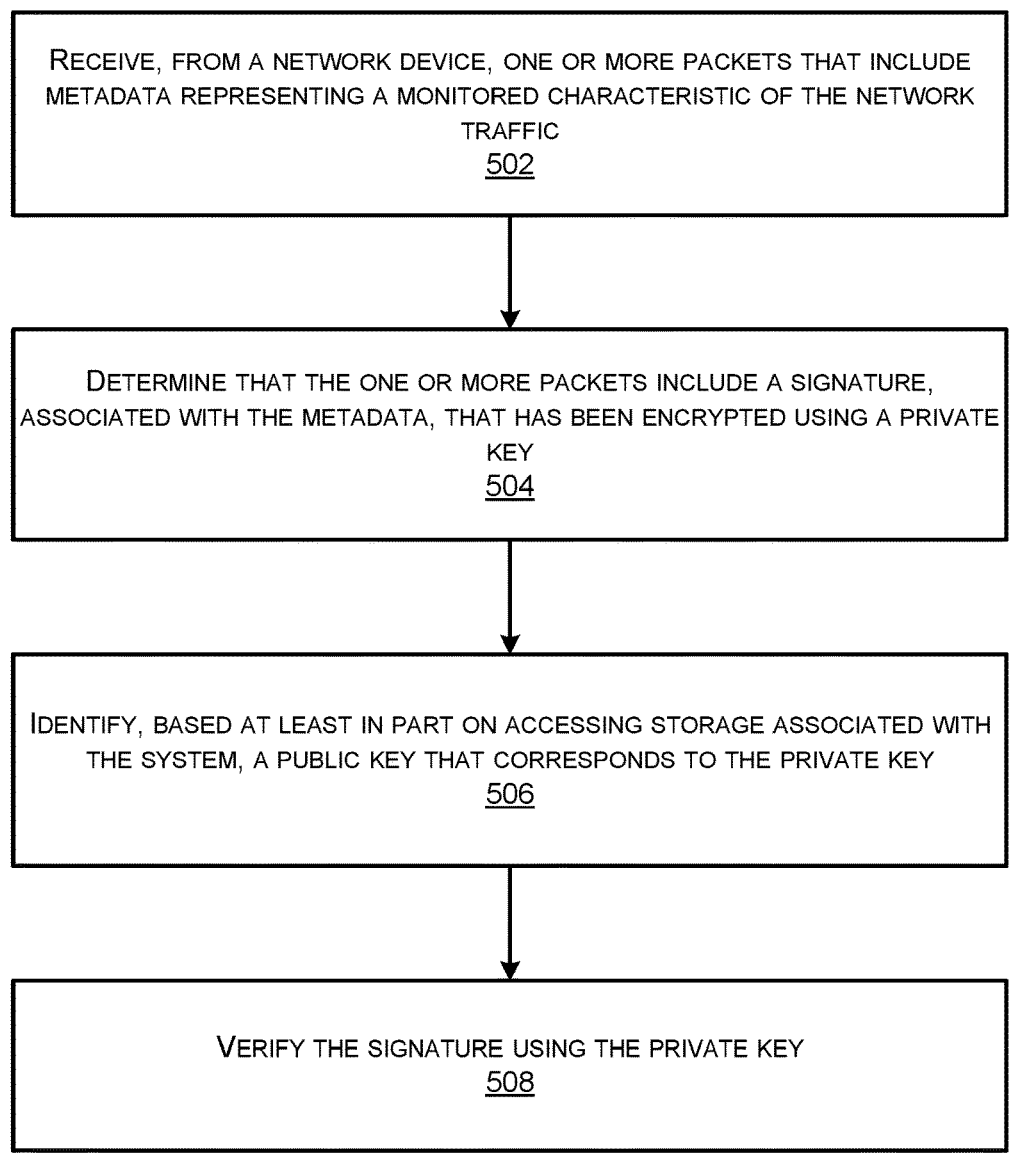
FIG. 5 illustrates a flow diagram of an example method for a system to verify signature(s) included in a packet received from a network device.

FIG. 5 illustrates a flow diagram of an example method 500 for a system to verify signature(s) included in a packet 116 received from a network device 112. In some instances, the techniques may be performed by a system (e.g., one or more devices), such as the collection system 124, a server, a combination thereof, and/or any other devices (e.g., hardware offload chips and/or any other device). The techniques of method 500 may be performed by a system that includes one processor, or more than one processor.

At 502, the system may receive, from a network device, one or more packets that include metadata representing a monitored characteristic of the network traffic. For instance, the system may receive one or more packets, such as network packet 202 described above. In some examples, the metadata may include a monitored characteristic (e.g., volume of traffic, traffic type, destinations, etc.) of the network flow. As described above, the one or more packets may comprise a header, template flowset(s), template record(s), record flowset(s), and data record(s). In some examples, the one or more packets may comprise one or more signature(s) associated with the metadata. In some examples, the one or more signature(s) may be included in a template 300 of a packet.

At 504, the system may determine that the one or more packets include a signature, associated with the metadata, that has been encrypted using a private key. For instance, the system may identify that a signature associated with the metadata has been encrypted using a private key (e.g., a SUDI) associated with the network device 112. In some examples, the signature may include a proof of integrity. As described above, the proof of integrity 118 may comprise one or more of a Canary stamp 204 or a hardware fingerprint 206.

In some examples, the system may determine that the signature associated with the metadata further comprises a proof of freshness, that has been encrypted using the private key. As described above, the proof of freshness may comprise at least one of a time corresponding to a boot time of the network device (e.g., clock counter 208), a reboot count 208 of the network device, or a reset count 208 of the network device, and/or a count associated with a number of records (e.g., record count 210) contained within the one or more packets. In some examples, system may determine that the signature associated with the metadata further comprises a proof of completeness, that has been encrypted using the private key. As described above, the proof of completeness may comprise a sequence number (e.g., a sequence count 212) corresponding to the one or more packets.

At 506, the system may identify, based at least in part on accessing storage associated with the system, a public key that corresponds to the private key. For instance, the system may access storage 126. As described above, storage 126 may contain all public keys associated with network device(s), hardware card(s), SUDIs, etc., within the system.

At 508, the system may verify the signature using the public key. For instance, the system may decrypt the signature included in the packet using the public key. Based on decrypting the signature, the system may verify that the signature corresponds to one or more of a proof of integrity 118, proof of freshness 120, and/or proof of completeness 122.

Figure 6:
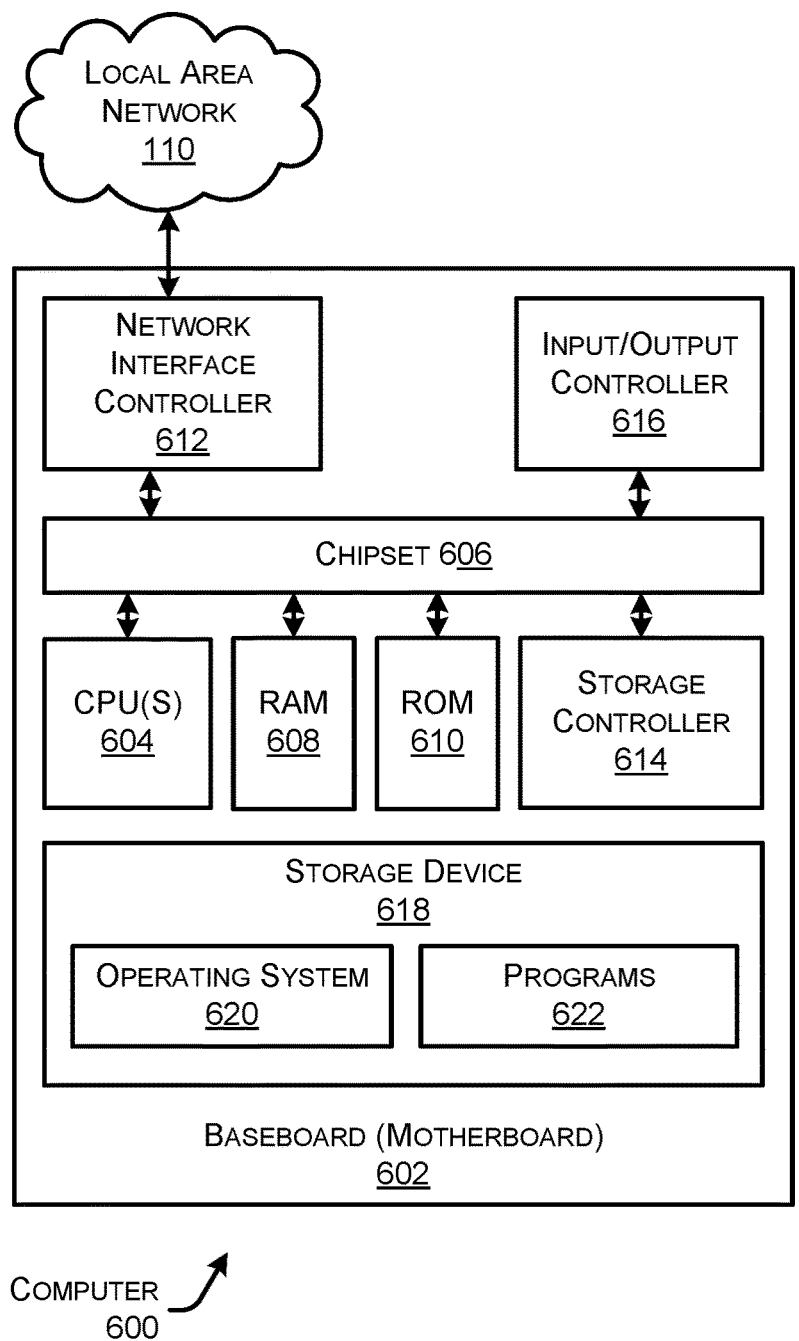
FIG. 6 is a computer architecture diagram showing an illustrative computer hardware architecture for implementing a server device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a network device 112, a collection system 124, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the LAN 110, Internet 106, Remote Site(s) 108, etc. The chipset 606 can include functionality for providing network connectivity through a NIC 612, such as a gigabit Ethernet adapter. The NIC 612 is capable of connecting the computer 600 to other computing devices over the LAN 110. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network device 112, the collection system 124, and/or any components included therein, may be supported by one or more devices similar to computer 600. Stated otherwise, some or all of the operations performed by network device 112 and/or collection system 124, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a network device 112, a collection system 124, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the network device 112, the collection system 124, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for signing and verifying packets sent through a network using hardware-based signatures. For instance, the programs 622 may cause the computer 600 to perform techniques for monitoring network traffic, generating one or more packets that include metadata representing a monitored characteristic of the network traffic, generating, at least partly by a secure hardware chip of the network device and using a private key, a signature indicating the metadata was generated at the network device, and populating the one or more packets with the signature indicating the metadata was generated at the network device. In this way, collectors within a service network can not only verify that the data has not been tampered with during transmission from the network device, but also that the network device itself is in a secure and trustworthy data source. By ensuring that the data source is secure, the techniques described herein improve network security and reduce harm to the network and applications that rely on the information transmitted from the data source. Additionally, the programs 622 may comprise instructions that cause the computer 600 to perform the specific techniques for receiving packets and decrypting signatures within the packets using different encryption protocols to verify the data source.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a network device that monitors network traffic through a network, the method comprising:
   receiving the network traffic that is flowing through the network;
   generating one or more packets that include metadata representing a monitored characteristic of the network traffic;
   generating, by a secure hardware chip of a plurality of secure hardware chips embedded in the network device and using a private key, a signature comprising (i) a unique identifier stored within the secure hardware chip that indicates the metadata was generated by the secure hardware chip of the plurality of secure hardware chips on the network device, (ii) a time at which the metadata was generated at the network device, and (iii) a number of resets of the network device, wherein individual secure hardware chips of the plurality of secure hardware chips store individual unique identifiers;
   populating the one or more packets with the signature indicating the metadata was generated at the network device and the time at which the metadata was generated at the network device; and
   sending the one or more packets to a collection system associated with a network monitoring system.

2. The method of claim 1, wherein the signature further comprises a number of reboots.

3. The method of claim 1, wherein the signature comprises at least one of a Canary stamp or a hardware fingerprint.

4. The method of claim 1, the signature further comprises a sequence number.

5. The method of claim 1, wherein the secure hardware chip is a forwarding line card or a forwarding line chip, the method further comprising:
   sending, by the forwarding line card or the forwarding line chip, the network traffic to a neighbor network device.

6. The method of claim 1, wherein the secure hardware chip is a forwarding line card or a forwarding line chip, the method further comprising:
   generating by the forwarding line card or the forwarding line chip the signature.

7. The method of claim 1, wherein the network device comprises a router or a switch.

8. A network device comprising:
   one or more processors; and
   one or more non-transitory computer-readable media storing computer-executable instructions that, when executed by the one or more processors, cause the one or more processors to perform operations comprising:
   receiving network traffic that is flowing through a network;
   generating one or more packets that include metadata representing a monitored characteristic of the network traffic;
   generating, by a secure hardware chip of a plurality of secure hardware chips on the network device and using a private key associated with the network device, a hardware signature indicating the metadata was generated by the network device, a time at which the metadata was generated by the network device, and a number of reboots of the network device;
   populating each respective packet of the one or more packets with the hardware signature indicating the metadata was generated at the network device, the time at which the metadata was generated at the network device, and the number of reboots; and
   sending the one or more packets to a collection system associated with a network monitoring system.

9. The network device of claim 8, wherein the number of reboots is stored by a trusted platform module of the network device.

10. The network device of claim 8, wherein individual secure hardware chips of the plurality of secure hardware chips store unique identifiers that identify respective individual secure hardware chips.

11. The network device of claim 8, wherein the hardware signature further indicates a sequence number associated with a record of a packet.

12. The network device of claim 8, wherein the secure hardware chip is a forwarding line card or a forwarding line chip, the operations further comprising:
   sending, by the forwarding line card or the forwarding line chip, the network traffic to a neighbor network device.

13. The network device of claim 8, wherein the secure hardware chip is a forwarding line card or a forwarding line chip, the operations further comprising:
   generating by the forwarding line card or the forwarding line chip the hardware signature.

14. The network device of claim 8, wherein the network device comprises a router or a switch.

15. A system for monitoring flow of network traffic over a network, the system comprising:
   one or more processors; and
   one or more non-transitory computer-readable media storing computer-executable instructions that, when executed by the one or more processors, cause the one or more processors to perform operations comprising:
   receiving, from a network device, one or more packets that include metadata representing a monitored characteristic of the network traffic;
   determining that the one or more packets include a signature, associated with the metadata, that has been encrypted using a private key, the signature being generated by a particular secure hardware forwarding chip of a plurality of secure hardware chips of the network device based on the signature comprising a unique identifier stored by the particular secure hardware forwarding chip;

identifying, based at least in part on accessing storage associated with the system, a public key associated with the network device that corresponds to the private key; and verifying the signature using the public key.

16. The system of claim 15, wherein the unique identifier comprises at least one of a Canary stamp or a hardware fingerprint.

17. The system of claim 15, further comprising:

determining that the metadata further comprises a proof of freshness, that has been encrypted using the private key; and verifying the signature using the public key.

18. The system of claim 17, wherein the proof of freshness comprises at least one of a time corresponding to a boot time of the network device, a reboot count of the network device, or a reset count of the network device, and a count associated with a number of records contained within the one or more packets.

19. The system of claim 17, further comprising:

determining that the metadata further comprises a proof of completeness, that has been encrypted using the private key; and verifying the signature using the public key.

20. The system of claim 19, wherein the proof of completeness comprises a sequence number corresponding to the one or more packets.

\* \* \* \* \*